United States Patent
Stephens et al.

(10) Patent No.: US 6,519,262 B1
(45) Date of Patent: Feb. 11, 2003

(54) TIME DIVISION MULTIPLEX APPROACH FOR MULTIPLE TRANSMITTER BROADCASTING

(75) Inventors: Scott A. Stephens, Manhattan Beach, CA (US); Terrence R. Smigla, Pacific Palisades, CA (US)

(73) Assignee: TRW Inc., Redonda Beach, CA (US)

( * ) Notice: Subject to any disclaimer, the term of this patent is extended or adjusted under 35 U.S.C. 154(b) by 0 days.

(21) Appl. No.: 09/095,486

(22) Filed: Jun. 10, 1998

(51) Int. Cl.[7] ............................. H04B 7/212; H04J 3/16; H04Q 7/00
(52) U.S. Cl. ....................................... 370/442; 370/314
(58) Field of Search ................................. 370/314, 321, 370/322, 329, 337, 442, 443

(56) References Cited

U.S. PATENT DOCUMENTS

| | | | | |
|---|---|---|---|---|
| 3,927,269 A | * | 12/1975 | Yoshino et al. ................ 179/15 |
| 4,245,339 A | * | 1/1981 | Agricola et al. ............... 370/58 |
| 5,006,855 A | * | 4/1991 | Braff ........................... 342/357 |
| 5,448,621 A | * | 9/1995 | Knudsen ...................... 379/58 |
| 5,483,541 A | | 1/1996 | Linsky |
| 5,539,730 A | * | 7/1996 | Dent ........................... 370/29 |
| 5,584,046 A | * | 12/1996 | Martinez et al. ........... 455/13.1 |
| 5,592,471 A | | 1/1997 | Briskman |
| 5,600,672 A | * | 2/1997 | Oshima et al. .............. 375/219 |
| 5,875,214 A | * | 2/1999 | Urbaniak et al. ........... 375/341 |
| 5,966,377 A | * | 10/1999 | Murai ......................... 370/342 |
| 5,978,366 A | * | 11/1999 | Massingill et al. ......... 370/337 |
| 6,092,165 A | * | 7/2000 | Bolyn ......................... 711/167 |

OTHER PUBLICATIONS

Overview of Techniques for Mitigation of Fading and Shadowing in the Direct Broadcast Satellite Radio Environment, David Bell, John Gevargiz, Arvydas Vaisnys and David Julian.

* cited by examiner

Primary Examiner—Alpus H. Hsu
Assistant Examiner—Toan Nguyen
(74) Attorney, Agent, or Firm—Harness, Dickey & Pierce, P.L.C.

(57) ABSTRACT

A time division multiplex (TDM) communication system (10) for broadcasting to users. The TDM communication system (10) includes a first transmitter (14) which broadcasts a first signal into a first coverage area (30) and a second transmitter (16) which broadcasts a second signal into a second coverage area (30) which at least partially overlaps said first coverage area (30). The first transmitter (14) is allocated a first TDM time block (88) having a first guard time (48) and the second transmitter (16) is allocated a second TDM time block (88) having a second guard time (48). The first (88) and second time blocks (88) form at least a portion of a TDM repeat interval such that the first transmitter (14) broadcasts the first signal during the first TDM time block (88) and the second transmitter (16) broadcasts the second signal during the second TDM time block (88).

25 Claims, 8 Drawing Sheets

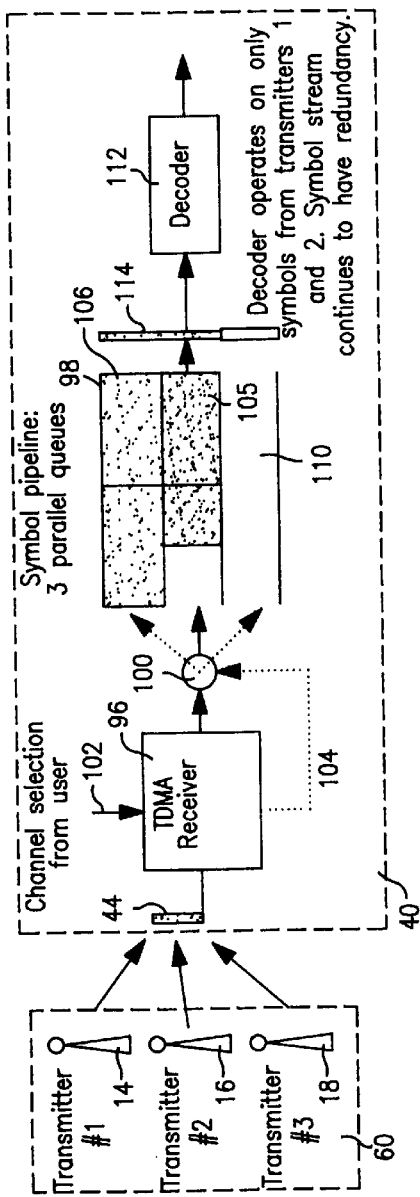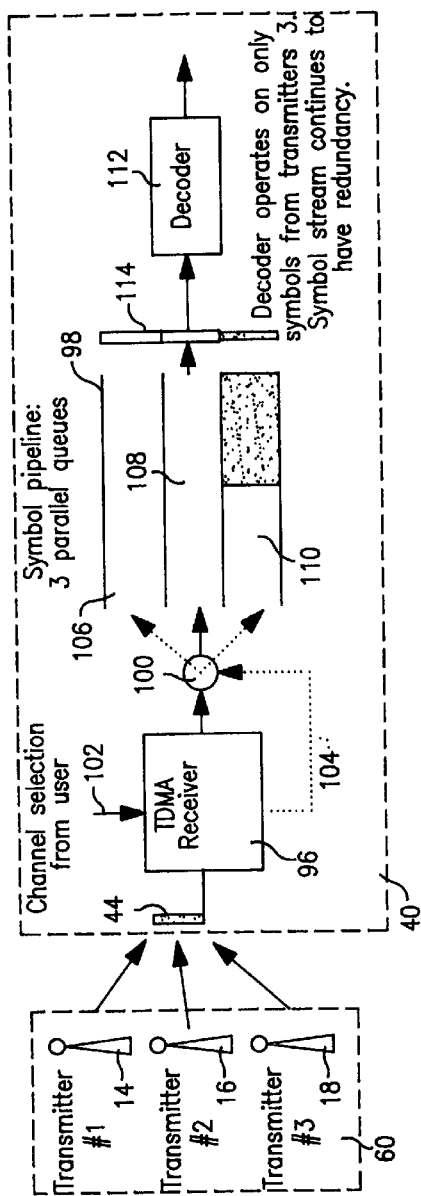

TIME DIVISION MULTIPLEX APPROACH FOR MULTIPLE TRANSMITTER BROADCASTING

BACKGROUND OF THE INVENTION

1. Field of the Invention

This invention relates generally to a communication system and, more particularly, to a communication system utilizing a time division multiplex (TDM) approach for multiple transmitter broadcasting to mobile users.

2. Discussion of the Related Art

For communication systems in which information is broadcast to mobile users, one challenge in such systems is overcoming signal degradation effects associated with mobile propagation. The mobile user is subject to a time-varying environment that includes attenuation from physical blockages (i.e. buildings, trees, terrain, etc.), as well as multipath and interference effects. One way of overcoming these effects is to increase the transmit power beyond what is required for clear-line-of-sight (CLOS) operation in a multipath-free and interference-free environment. However, due to the large amount of additional transmit power often required, this is not always feasible for practical communication systems. This is particularly relevant for satellite-based communication systems broadcasting to mobile users. Although, there is generally less blockage for satellite-based systems than terrestrial-based systems due to the higher elevation angles, it is still difficult in a satellite-based system to transmit enough power to overcome the signal attenuation effects, particularly in outer fringe areas of the coverage region or in urban environments.

Communication systems are also increasingly expected to be capacity efficient and heavy demands are currently required on many different types of digital communication channels. With many of these communication channels, a relatively large amount of bit errors may occur because of the noted physical blockage in a relatively short period of time within a sequence of transmitted bits. Errors occurring in this manner are generally referred to as burst errors, and thus, such communication channels, particularly mobile communication channels, are typically referred to as bursty or fading channels.

Consequently, communication systems operating in the mobile propagation environment have both time and, spacial dependencies. Conventional communication systems may thus employ coding and interleaving, as well as clear-line-of-sight link margins to combat the time and spatially vary mobile propagation environment. Although such techniques may be somewhat effective in this environment, current implementations are not very efficient in terms of the way they utilize the available power, bandwidth and receiver resources.

Traditional coding methods for communication systems operating through a bursty or fading channel often employ some form of interleaving in order to make the communication system more reliable. As is known in the art, interleaving attempts to spread the effect of burst errors in time such that the bit errors are decorrelated and separated from one another. This repositioning of error bits tends to separate the error bits so that they can be processed in conjunction with an encoding and decoding communication system. A convolutional or block decoder is able to tolerate up to some fraction of its input bits degraded or erased, known as the decoder's erasure threshold, and still provide acceptable performance, measured by bit error probability. The purpose of the conventional interleaver is thus to reduce the probability that the decoder's erasure threshold is exceeded.

Moreover, for satellite broadcast systems, it is also generally desirable to have complimentary terrestrial transmitters should the satellite transmitters fail. However, the existing communication systems which use both satellite and terrestrial transmitters, such as the European Eureka 147 System or the Global Star Cellular System, each employ a rake receiver which has its disadvantages. Specifically, in each of these systems, the satellite transmitters, as well as the terrestrial transmitters transmit the identical digital data bits using identical RF carrier signals. The rake receiver detects both RF carrier signals and synchronizes both signals to combine each into one robust signal containing the identical digital data. Such systems do provide for a more robust communication system. Although, the simple retransmission of identical digital data bits using identical RF carrier signals is not a flexible approach. In addition, rake receivers are also very complex and costly receivers. Furthermore, time division multiple access (TDMA) communication systems, using a single frequency band have been used where the identical TDMA signals are broadcast from more than one transmitter. However, in each of these systems, which are typically cellular telephone communication systems, the receiver must select a single transmitter to receive from and then hand-off between transmitters when one transmitter signal becomes degraded. Here again, this technique is not a flexible and cost effective way for dealing with burst errors because the receiver may be blocked from receiving signals from a particular transmitter and must then be reconfigured to hand-off to a new transmitter which is not blocked, thereby requiring substantially complex and expensive hardware and software. Moreover, this system also merely transmits the same data bits.

What is needed then is a communication system for broadcasting to mobile users which utilizes a time division multiplex (TDM) approach for multiple transmitter broadcasting which does not suffer from the above-mentioned disadvantages. This will, in turn, provide a more robust communication system; utilize a single frequency band for transmitting redundant or non-redundant information from multiple transmitters to a single receiver in a time division multiplex manner; provide complimentary terrestrial transmitters which operate within the same frequency band as satellite transmitters, broadcast additional local information, relay redundant satellite information to regions which can not receive the satellite signals directly, and which can be received by the, receiver independent of the operation of the satellites; provides a flexible multi-transmitter system with a low complexity and cost efficient receiver; provide a communication system which is dynamic in its allocation of time blocks for each transmitter; increase the quality of signals; provides a reliable communication system to mobile users which minimizes outages; provides a flexible and efficient means of integrating unique and common information into each transmitters broadcast signal; and provides a more robust communication system by using two levels or layers of time division multiplexing. It is, therefore, an object of the present invention to provide a communication system which utilizes a time division multiplex (TDM) approach for multiple transmitter broadcasting to mobile users.

SUMMARY OF THE INVENTION

In accordance with the teachings of the present invention, a time division multiplex (TDM) communication system for broadcasting to users is disclosed. The TDM communication system utilizes two (2) levels of time division multiplexing, such that multiple transmitters transmit in a time division multiplexed manner to a receiver which is operable to receive the signals from each of the transmitters.

In one preferred embodiment, a time division multiplex (TDM) communication system for broadcasting to users includes a first transmitter and a second transmitter. The first transmitter is operable to broadcast a first signal into a first coverage area and the second transmitter is operable to broadcast a second signal into a second coverage area, which at least partially overlaps the first coverage region. The first transmitter is allocated a first TDM time block having a first guard time and the second transmitter is allocated a second TDM time block having a second guard time. The first and second TDM time blocks form at least a portion of the TDM repeat interval such that the first transmitter broadcasts the first signal during the first TDM time block and the second transmitter broadcasts the second signal during the second TDM time block.

In another preferred embodiment, a time division multiplex (TDM) communication system for broadcasting to users includes a plurality of transmitters and a receiver. Each of the transmitters is allocated a TDM time block in which to transmit a signal such that the TDM time blocks from the plurality of transmitters forms a TDM repeat interval. The receiver is operable to receive each of the signals from each of the transmitters during each of the TDM time blocks over the TDM repeat interval.

In yet another preferred embodiment, a time division multiplex (TDM) communication system for broadcasting to users includes a channel coding device and a waveform generation device. The channel coding device includes a plurality of first time multiplexers each of which is operable to receive a plurality of channels and operable to time multiplex the plurality of channels into a TDM channel data stream. The waveform generation device includes a plurality of second time multiplexers. The plurality of second time multiplexers is operable to time multiplex each of the TDM channel data streams between a plurality of transmitters. Each of the transmitters is allocated a separate TDM time block forming a portion of a TDM repeat interval.

The use of the present invention provides a communication system which utilizes a time division multiplex approach for multiple transmitter broadcasting to mobile users. As a result, the aforementioned disadvantages associated with the current communication systems have been substantially reduced or eliminated.

BRIEF DESCRIPTION OF THE DRAWINGS

Still, other advantages of the present invention will become apparent to those skilled in the art after reading the following specification and by reference to the drawings in which:

FIG. 7 is a first example of the operation of the receiver of FIG. 3;

FIG. 8 is a second example of the operation of the receiver of FIG. 3;

DETAILED DESCRIPTION OF THE PREFERRED EMBODIMENT(S)

The following descriptions of the preferred embodiments concerning time division multiplex (TDM) communication systems which utilizes a TDM approach for multiple transmitter broadcasting to mobile users are merely exemplary in nature and are not intended to limit the invention or its application or uses. Moreover, while the invention is discussed in detail below with respect to mobile users receiving audio signals, those skilled in the art will recognize that the TDM communication system may be used by others to receive any type of data signals.

Figure 1:
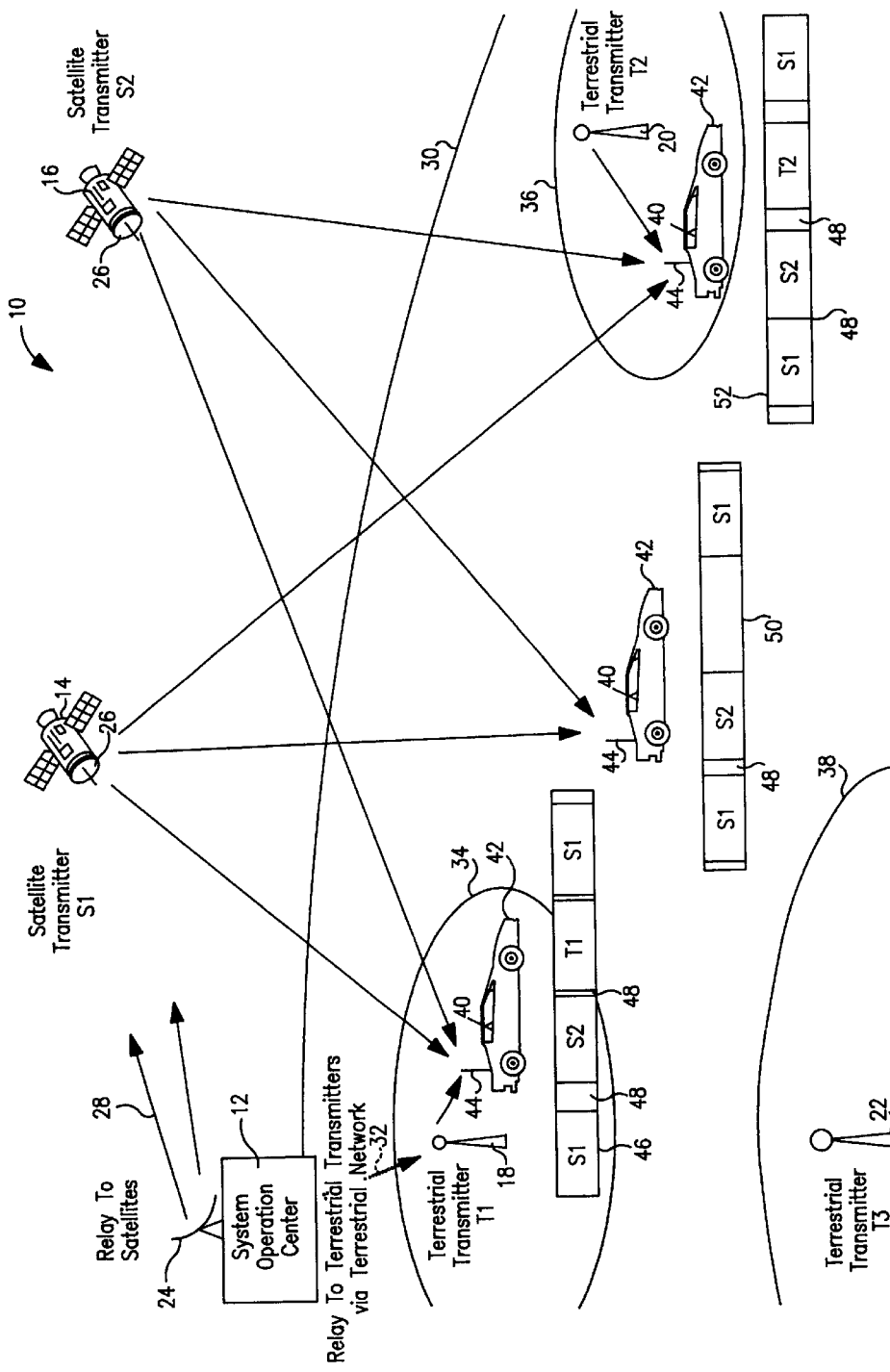
FIG. 1 is an overall communication system block diagram according to the teachings of the present invention.

Referring to FIG. 1, a TDM communication system 10 for broadcasting to mobile users in a system environment is shown. The communication system 10 includes a national system operation center 12 which transmits data signals to, multiple satellite transmitters and multiple terrestrial transmitters. The multiple satellite transmitters includes a first bent pipeline satellite transmitter 14 and second bent pipeline satellite transmitter 16. The terrestrial transmitters includes a first terrestrial transmitter 18, a second terrestrial transmitter 20, and a third terrestrial transmitter 22. While two (2) satellite transmitters 14 and 16 and three (3) terrestrial transmitters 18 to 22 are shown, it will be appreciated by those skilled in the art that various combinations or numbers of transmitters, including only satellite transmitters or terrestrial transmitters may be utilized.

The system operation center 12 preferably transmits audio data signals to the satellite transmitters 14 and 16, via an antenna 24, utilizing an RF carrier signal, such as C-band or X-band, which have a frequency range between about 5 GHz to about 12 GHz. Each satellite transmitter 14 and 16 receives at antenna 26, the modulated audio data signals, via an RF carrier signal relay 28. The bent pipeline satellite transmitters 14 and 16 will preferably down convert the RF carrier signal by mixing it with its own oscillating frequency to provide a RF broadcast carrier signal in S-band which has a frequency of about 2 GHz. Here again, the frequency bands set forth herein are merely exemplary in nature and it will be understood that any type of frequency band available may be used.

Each satellite transmitter 14 and 16 retransmits or broadcasts the audio data signals received from the system operation center 12 into its corresponding overlapping coverage area or region 30, via antennas 26. Each overlapping coverage area 30 covered by each satellite transmitter 14 and 16 is preferably the continental United States and the use of the two (2) satellite transmitters 14 and 16 provides redundancy substantially throughout the overlapping coverage areas 30 in order to provide for any unforeseen difficulties with either of the satellites 14 and 16. Should different overlapping coverage areas be desired that are smaller or larger, a different number of satellites may be used for such coverage areas.

The system operation center 12 further transmits the audio data signals, preferably in digital form as opposed to an RF carrier signal, to each of the terrestrial transmitters 18 to 22, via a relay 32, using a digital fiberoptic link. Alternatively, point-to-point microwave transmission may also be utilized should the particular terrestrial transmitter be close enough in proximity to the system operation center 12 or any other appropriate transmission medium. Each terrestrial transmitter 18 to 22 modulates the digital audio data signals on the same RF broadcast carrier signal or frequency band that the satellite transmitters 14 and 16 use, such as S-band (2 GHz). Each of the terrestrial transmitters 18 to 22 may rebroadcast the audio data signals received from the system operation center 12 or audio data signals generated at a separate local system operation center where the particular terrestrial transmitter is located. Each of the terrestrial transmitters 18 to 22 broadcasts into its respective coverage area 34, 36 and 38, which may be spatially separate from one another and all within the coverage areas 30.

Various mobile receivers 40 in vehicles 42 operating within coverage areas 30 are operable to receive the modulated audio data signals from the satellite transmitters 14 and 16, via antenna 44. The mobile receivers 40 are also operable to receive the modulated audio data signals from any of the terrestrial transmitters 18 to 22, should the mobile receiver 40 be located in any of the coverage areas 34 to 38.

Each of the mobile receivers 40 is operable to receive audio data signals from each of the transmitters substantially simultaneously in a time division multiplex (TDM) manner. For example, assume that the mobile receivers 40 are each configured to receive three (3) transmitter signals substantially simultaneously over a TDM repeat interval, that each satellite transmitter 14 and 16 is configured to: transmit twenty (20) national broadcast audio channel signals, and each terrestrial transmitter 18 to 22 is configured to either broadcast five (5) local broadcast audio channel signals or the twenty (20) national broadcast audio channel signals. Also assume that a 1 second receiver time block or TDM repeat interval is divided into 3 separate transmitter time blocks, each of which is 0.333 seconds, with the first satellite transmitter 14 having a first transmitter time block $S_1$, the second satellite transmitter 16 having a second transmitter time block $S_2$ and each of the terrestrial transmitters 18 to 22 having a third transmitter time block $T_n$ allocated or shared by all the terrestrial transmitters 18 to 22 which are shown spatially separated to allow for spectrum re-use.

Receiver 40 in vehicle 42 within coverage area 34 is operable to receive audio signals from satellite transmitter 14, satellite transmitter 16, and terrestrial transmitter 18 in a time division multiplex (TDM) matter. In this regard, referring to receiver time block 46, audio data signals within TDM bursts or time blocks $S_1$, $S_2$ and $T_1$ from satellite transmitter 14, satellite transmitter 16 and terrestrial transmitter 18, respectively, are shown being received by receiver 40 with a varying guard time 48 located at the beginning of each TDM burst or time block $S_1$, $S_2$ and $T_1$. The maximum guard time 48 show is equal to the maximum: time-of-arrival variation between the adjacent transmitters. Therefore, time block $S_1$ is shown farther to the left in the receiver time block 46 because satellite transmitter 14 is closer to mobile receiver 40 within coverage area 34. Time block $S_2$ is shown with a large guard time 48 between $S_1$ and $S_2$ because of the additional time it takes for mobile receiver 40, within coverage area 34, to receive the audio data signals ($S_2$) from satellite transmitter 16. Time block $T_1$ is shown with a smaller guard time 48 which varies depending on the location of the terrestrial transmitter 18 relative to the satellite transmitters 14 and 16.

Referring to receiver time block 50, it can be seen that mobile receiver 40, within coverage area 30, only receives audio signals from the satellite transmitters 14 and 16 ($S_1$ and Here, the guard time 48 is larger before time block Si because of the additional time it takes for the audio data signals from satellite transmitter 14 to reach this mobile receiver 40 and the guard time 48 before time block $S_2$ is smaller because of the less time it takes for the audio data signals from satellite transmitter 16 to reach this mobile receiver 40. Referring to receiver time block 52, time block Si is shown farther to the right which graphically shows the additional delay in the mobile receiver 40 receiving the audio data signals from satellite transmitter 14, whereas the guard time 48 between time blocks $S_1$ and $S_2$ is very narrow in this location because of the positioning of satellite transmitter 16 which is in close proximity to the mobile receiver 40 in coverage area 36.

Figure 2:
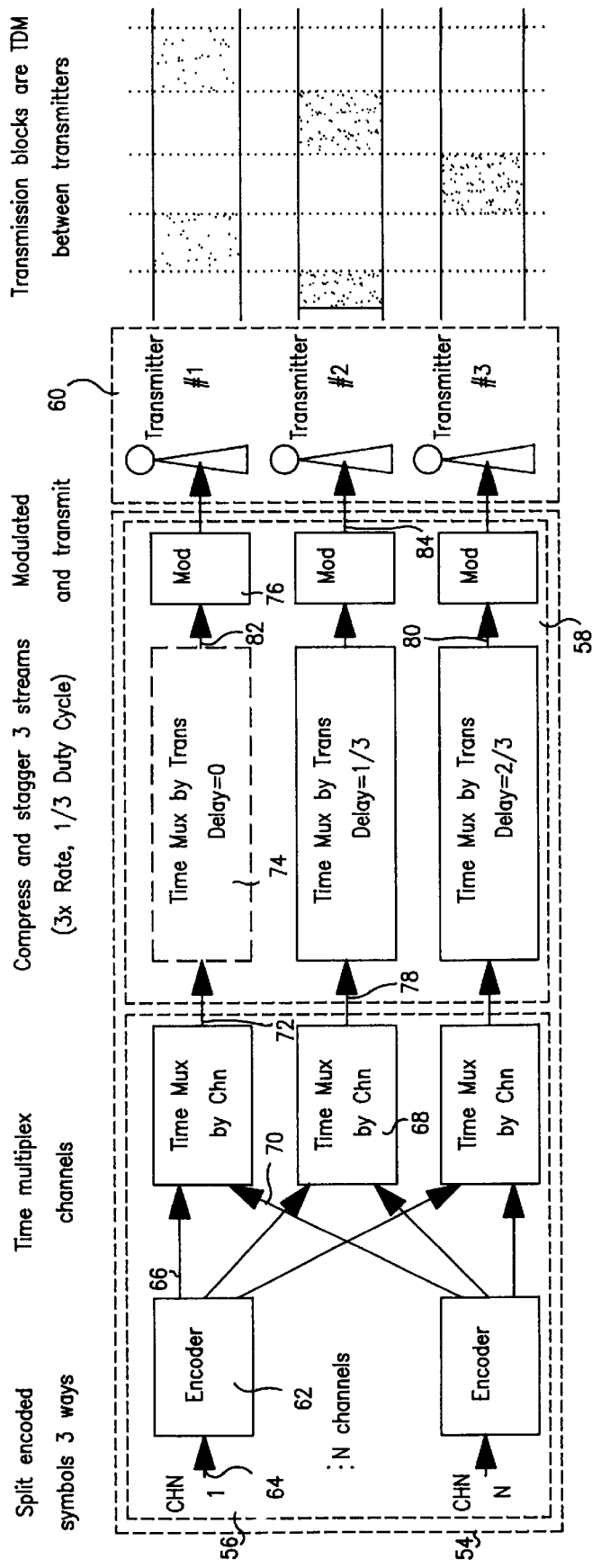
FIG. 2 is a detailed schematic block diagram of a channel coding/transmission system according to the teachings of a first preferred embodiment of the present invention.

Referring now to FIG. 2, a detailed schematic block diagram of a channel coding/transmission system 54 forming a portion of TDM communication system 10 according to a first preferred embodiment of the present invention as shown. The channel coding/transmission system 54 may be located within the system operation center 12, the satellite transmitters 14 and 16 or the terrestrial transmitters 18 to 22 depending on the particular configuration utilized and further discussed herein. The channel coding/transmission system 54 includes a channel coding section 56 and a waveform generation section 58 which transmits the audio data signals, via transmitters 60.

The channel coding section 56 includes a plurality of error correction encoders 62. There are N number of: encoders 62 with each related to a specific audio broadcast channel. Each encoder 62 includes an input 64 which receives a digital audio data signal and a plurality of outputs 66, the number of which relate to the number of transmitters 60 being utilized substantially simultaneously. The error correction encoders 62 are conventional error correction encoders which use error correction coding to expand the digital audio data signal or data bits received at input 64 by an encoder rate. Preferably, a one-twelfth ($\frac{1}{12}$) rate encoder 62 is selected, such that each digital audio data bit through the encoder 62 will be expanded to twelve (12) audio code bits with four (4) of the code bits being delivered from each output 66.

The expanded code bits are then applied to a plurality of first time multiplexers 68, via inputs 70, which time multiplex by channel. The number of time multiplexers 68 depends on the number of transmitters 60 being used substantially simultaneously and the number of inputs 70 to the time multiplexers 68 depends on the number of encoders 62 or N channels being encoded. Each time multiplexer 68 obtains four (4) code bits from each encoder 62 and adds them together in time to create a TDM channel data stream or first level of time division multiplexing (TDM) in the communication system 10. The time multiplexers 68 each have a single output 72 that outputs the time division multiplexed audio code bits or TDM channel data stream which have been encoded, similar, to that shown in the TDM timeline of FIG. 4 (i.e. channel 1, channel 2 . . . , channel N, channel 1 . . . , channel N).

The time division multiplexed audio code bits from the channel coding section 56 is applied to the waveform generation section 58 which includes a plurality of second time multiplexers 74 and a plurality of modulators 76. The number of time multiplexers 74 and modulators 76 depends on the number of transmitters 60 being utilized substantially simultaneously in the communication system 10. The time multiplexers 74 create the second level of time division multiplexing (TDM) in the communication system 10. Each time multiplexer 74 includes an input 78 which receives the encoded time division multiplexed audio channels or TDM channel data streams from time multiplexers 68 and an output 80. Assuming that the audio code bits from each time multiplexer 68 is being received at a rate of one mega bit per second (1 Mbps), each time multiplexer 74 will multiply this rate by a predetermined value to increase the bit transfer rate.

For example, assuming that there are three (3) transmitters 60 being employed, with each transmitter #1, #2 and #3 allocated the same size time block to transmit its data, the output bit transfer rate of the time multiplexer 74 will be three (3) times the input bit transfer rate in order to transmit all of the information in one-third the time. The time multiplexer 74 will therefore, increase the output bit rate to 3 Mbps and send out a TDM burst of coded audio bits. With a receiver time block of 1 second, each time multiplexer 74 will transfer its coded audio bits for 0.333 seconds, with each time multiplexer 74 operating on a one-third duty cycle. The first time multiplexer 74 will thus be on for the first one-third second and will be able to transfer all of its coded audio bits because of the increased bit rate with the second and third time multiplexers 74 following thereafter. This relationship is shown graphically to the right of FIG. 2 which shows each of the transmitters 60 transmitting TDM bursts of audio data in a time division multiplex manner with the audio data within the TDM bursts also being time division multiplexed, thereby creating two levels of time division multiplexing within the communication system 10.

The time division multiplexed audio code bits from each time multiplexer 74 is applied to an input 82 of the modulator 76. Each modulator 76 is a conventional modulator using a common modulation technique, such as PSK, FSK, QAM, etc. Each modulator 76 takes the coded audio bits from the time multiplexers 74 and modulates the coded audio data bits onto an RF carrier signal in the particular signal format selected. The modulated RF carrier signals are delivered to transmitters 60, via outputs 84. The RF carrier signals are then transmitted or broadcast by the transmitters 60 which may include the satellite transmitters 14 and 16 or the terrestrial transmitters 18 to 22, shown in FIG. 1. Each modulator 76 also inserts a synchronization field and a header field into each TDM burst or time block transmitted, further discussed herein.

Figure 4:
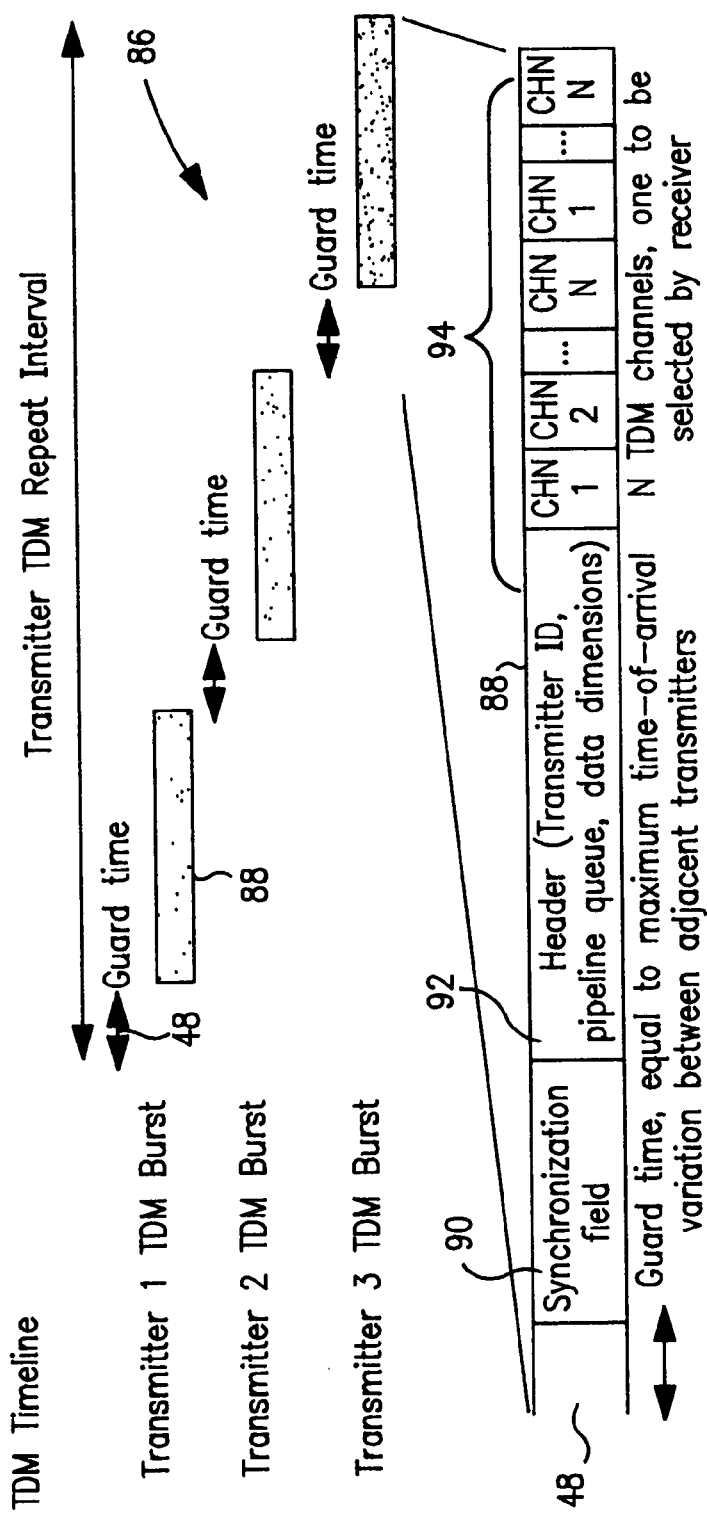
FIG. 4 is a TDM timeline setting forth the signals transmitted from the transmitters shown in FIGS. 2 and 3.

Turning to FIG. 4, a TDM timeline 86 is shown which identifies each TDM data burst 88 or time block from each of the transmitters 60, shown in FIGS. 1 and 2. Each TDM burst 88 which forms the TDM repeat interval includes the guard time 48 which is a period when no data is sent. The maximum guard time 48 is equal to the maximum time of arrival variation between adjacent transmitters. In other words, referring to FIG. 1, should satellite transmitter 14 be positioned on the west coast, and satellite transmitter 16 be positioned on the east coast, with the mobile receiver 40 being located on the west coast, the difference in time between receiving the data from the satellite transmitter 14 and the satellite transmitter 16 would be the maximum guard time 48 required for the communication system 10. Should the overlapping coverage areas 30 be the continental United States, the guard time 48 is preferably 9 milliseconds or +/−4.5 milliseconds on either end of the TDM burst 88. The guard time 48 will, of course, vary depending on the size of the coverage areas selected.

The synchronization field 90 is used by the mobile receiver 40 to synchronize both time and frequency with each of the transmitters 60. The synchronization field 90 includes phase and frequency information for each transmitter 60. The header 92 of each TDM burst 88 includes a transmitter ID, a pipeline queue and a data dimension. The transmitter ID identifies the transmitter 60 (#1, #2, #3) from which the TDM burst 88 originated with. The pipeline queue identifies where in a parallel pipeline or memory, the TDM burst 88 should be routed. The data dimension identifies the N number of audio channels and the number of times the N channels will repeat which is essentially the size of the TDM burst 88. Portion 94 diagrammatically identifies the time division multiplexed channel data or TDM channel data stream being transmitted by each transmitter 60 within the TDM burst 88. The TDM bursts 88 or coded audio data bits from each of the transmitters 60 may be redundant audio data or unique audio data. It should be noted that reference to redundant signals does not mean that the TDM data bursts 88 transmitted from each transmitter 60 are the same coded audio data bits, since the coded audio data bits from each channel are uniquely encoded and then time multiplexed by channel and by transmitter.

Figure 3:
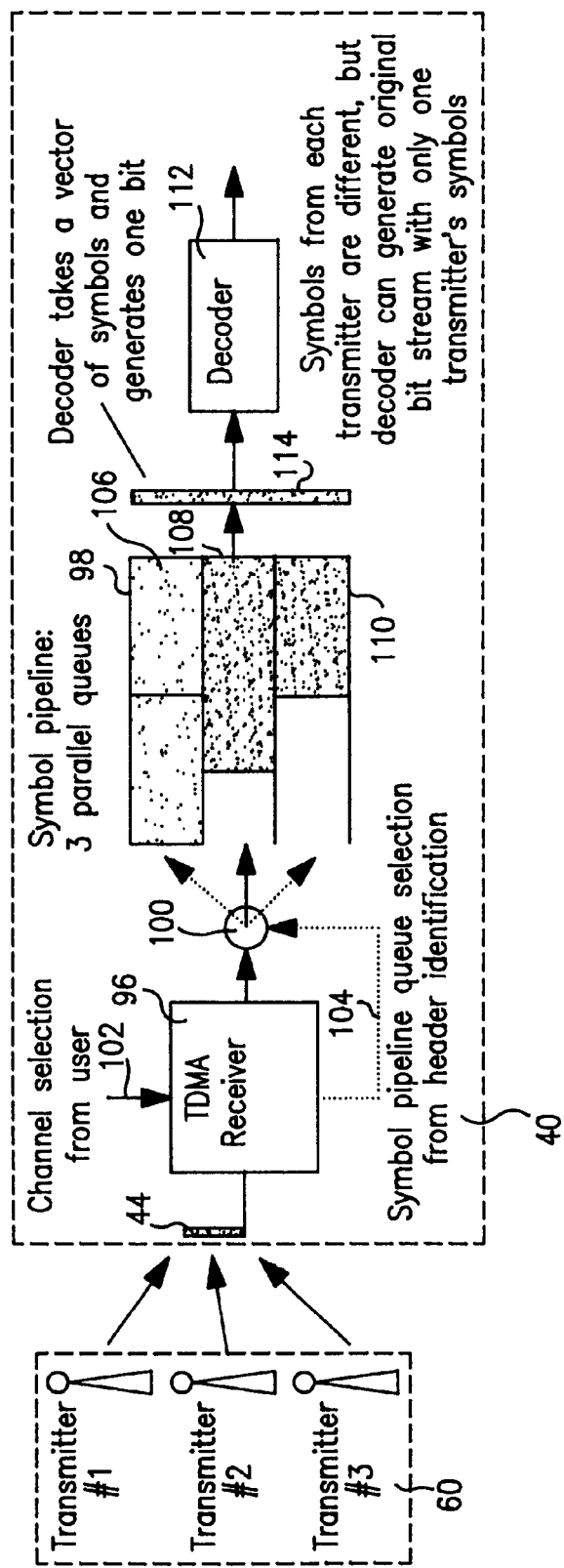
FIG. 3 is a detailed schematic block diagram of a receiver according to the teachings of the first preferred embodiment of the present invention.

Turning now to FIG. 3, the transmitters 60 are shown in combination with the mobile receiver 40. The receiver 40 uses a time division multiple access (TDMA) receiver 96 which receives the TDM bursts 88 from transmitters 60, via antenna 44. The TDMA receiver 96 may be formed from any conventional TDMA receiver and is operable to receive time division multiplex signals from the multiple transmitters 60 in a time division multiplexed manner. The TDMA receiver 96 receives the TDM bursts 88 on the modulated RF carrier signal and employs a conventional demodulator to strip or remove the RF carrier signal to convert the RF carrier signal containing the TDM burst 88 into only coded audio data bits.

A portion of the coded audio data bits are distributed in a symbol pipeline 98, which is a memory buffer within the receiver 40, via a switch or memory pointer 100 depending on which audio channel has been selected, via channel selection 102. Switch 100 allocates where the coded data bits will be routed in the parallel pipeline 98, via queue selection 104.

Coded audio data bits from transmitter #1 is put into a first parallel queue 106, coded audio data bits from transmitter #2 is put into a second parallel queue 108 and coded audio data bits from transmitter #3 is put into a third parallel queue 110. The switch or pointer 100 selects where the TDM bursts 88 are routed depending on which pipeline queue is identified in the header portion 92 of the TDM burst 88.

It should be noted that when each TDM burst 88 is received by the TDMA receiver 96, the TDMA receiver 96 will use the synchronization field 90 to time and frequency synchronize with the specific transmitter 60. The TDMA receiver 96 may also be configured to have an acquisition memory to retain the prior synchronization field for the particular transmitter. In this way, when a subsequent TDM burst 88 from a transmitter 60 is received, the TDMA receiver 96 will already be substantially in sync with the transmitter 60. As the symbol pipeline 98 acquires and is filled with data, a decoder 112 receives, at a continuous rate, a vector 114 of coded audio data bits representing a single audio data bit. The decoder 112 decodes this vector 114 to generate the decoded audio data bits for the particular channel selected from a user, via selection 102. In other words, the coded audio data bits in the symbol pipeline 98 is only the coded audio data bits for the particular channel selected.

Figure 5:
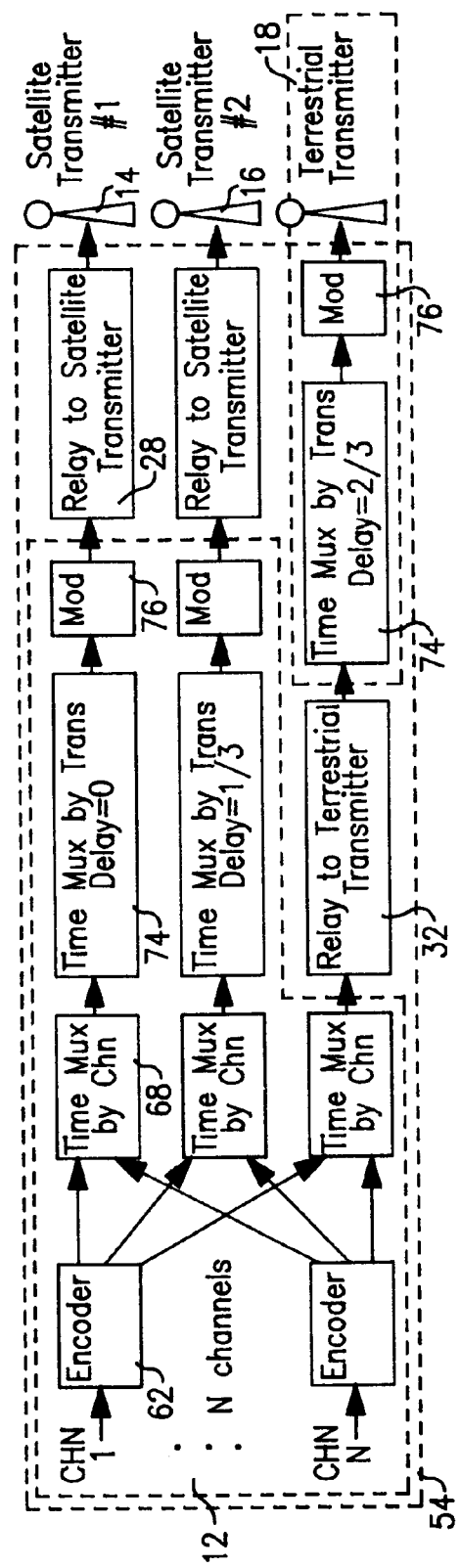
FIG. 5 is a detailed schematic block diagram of the channel coding/transmission system shown in FIG. 2 configured to operate with two satellite transmitters and one terrestrial transmitter which transmits national broadcast channels.

Referring to FIG. 5, the channel coding/transmission system 54 is shown configured to encode and transmit N channels with three transmitters, two of which are the satellite transmitters 14 and 16 and one of which is the terrestrial transmitter 18. In this configuration, the encoders 62, time multiplexers 68, and time multiplexers 74 and modulators 76 for the satellite transmitters 14 and 16 are all located within the system operation center 12. The relay to satellite transmitters 28 are the RF carrier signals to the satellite transmitters 14 and 16, via antenna 24, and the relay to terrestrial transmitter 32 is preferably the digital fiberoptic link and, is therefore, transmitted digitally before being time multiplexed by time multiplexer 74 and modulated by modulator 76 located at terrestrial transmitter 18. In this configuration, each satellite transmitter 14 and 16 and the terrestrial transmitter 18 preferably transmits the same channels 1 to N which are national broadcast channels in overlapping coverage areas. Accordingly, the receiver 40 will receive redundant national broadcast station information, each of which is separately encoded and time division multiplexed at two levels, thereby providing for a more robust signal. Such a configuration will generally be set up in an urban environment where tall buildings may block signals from the satellite transmitters 14 and 16.

Figure 6:
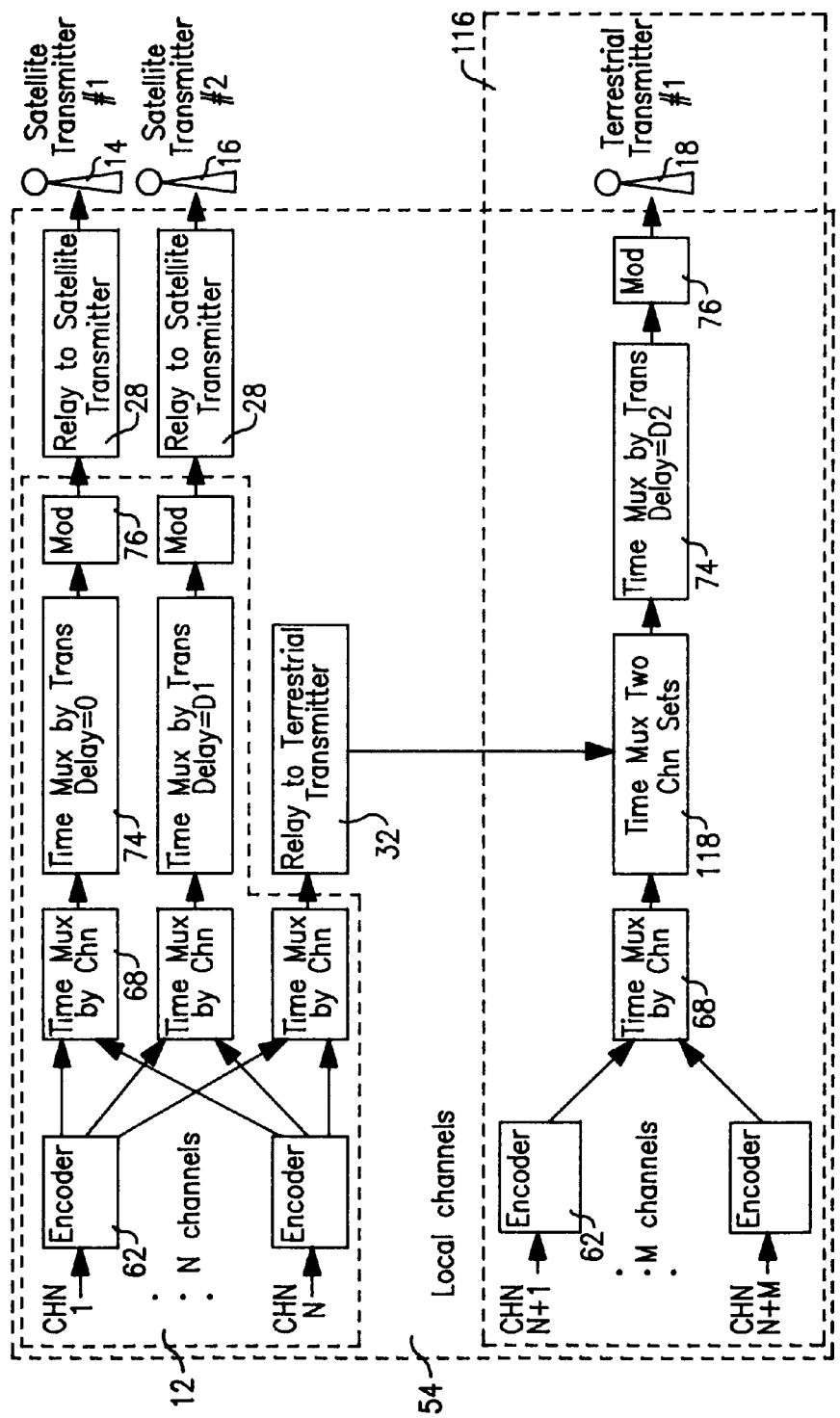
FIG. 6 is a detailed schematic block diagram of the channel coding/transmission system shown in FIG. 2 configured to operate with two satellite transmitters and one terrestrial transmitter which transmits both national and local broadcast channels.

Referring to FIG. 6, the channel coding/transmission system 54 is shown configured to encode both national broadcast channels and local broadcast channels and transmit the encoded channel data with the two satellite transmitters 14 and 16 and the terrestrial transmitter 18. Here again, the encoders 62, time multiplexers 68, time multiplexers 74 and modulators 76 for the satellite transmitters 14 and 16 are all located within the system operation center 12. The relay to satellite transmitters 28 are the RF carrier signals transmitted to satellite transmitters 14 and 16, via antenna 24 and the relay to terrestrial transmitter 32 is preferably the: digital fiberoptic link and is thus transmitted digitally to a local system operation center 116 which houses terrestrial transmitter 18. The local operation center 116 also includes encoders 62, time multiplexers 68, time multiplexers 74 and a modulator 76. The local operation center 116 further includes a time multiplexer 118 which time multiplexes the channel set for the national channels and the channel set for the local channels together into channels 1 to M. It should be noted that the time multiplexers 74 have delays 0, D1 and D2 which vary depending on the number of multiplexed channel data to be transmitted. For example, the time multiplexer 74 in the system operation center 12 will need to transmit channels 1 to N while the time multiplexer 74 in the local operation center 116 will be required to transfer channels 1 to M which include channels 1 to N, therefore requiring a longer delay to D2. The rate and duty cycle will also correspondingly change depending on the delays selected for each multiplexer 74.

In order to synchronize the delay D2 of the multiplexer 74 in the local operation center 116 with the delays in the time multiplexers 74 in the system operation center 12, the local operation center 116 may either use an open loop or a closed loop synchronization. For example, in an open loop synchronization, both the system operation center 12: and the local operation center 116 can predetermine the allocated time slots for its corresponding transmitters based upon a known timing system, such as the atomic standard time or the global positioning sensor (GPS) timing. Alternatively, the local operation center 116 may also utilize a closed loop synchronization technique by utilizing a separate receiver to monitor the TDM bursts 88 from satellite transmitters 14 and 16 in order to determine when its time slot becomes available to transmit with the terrestrial transmitter 18. It should be noted that the system 54 may also be configured to transmit only local broadcasting channels from terrestrial transmitters broadcasting into overlapping local coverage areas. Such a versatile system 10 also will enable the system 10 to be brought up with only terrestrial transmitters initially where each transmitter will be a terrestrial transmitter and subsequently configured to include satellite transmitters, as the satellite transmitters are added to the system 10 which will be transparent to the receiver 40.

Referring to FIG. 7, an example of the mobile receiver 40 is shown in which the receiver 40 is selecting a national broadcast channel, via selection 102, and the transmitters include satellite transmitters 14 and 16 which are transmitting only the national broadcast signals and terrestrial transmitter 18 which is only broadcasting local stations. With the TDMA receiver 96 tuned to a national broadcast channel, the TDMA receiver 96 will only transfer the coded audio data bits for the channel selected to fill the first parallel queue 106 and the second parallel queue 108 of symbol pipeline 98. The decoder 112 thereby selects the vector 114 or column of data from the symbol pipeline 98 which includes coded data bits from satellite transmitters 14 and 16 which each carry redundant channel data or information that is encoded differently.

Referring to FIG. 8, the receiver 40 is shown with the TDMA receiver 96 tuned to a local broadcast channel, via selection 102, with transmitter #1 being the satellite transmitter 14 and transmitter #2 being the satellite transmitter 16 and transmitter #3 being the terrestrial transmitter 18 that is transmitting the local broadcast channels. In this configuration, the symbol pipeline 98 is only filled with the local broadcast channel that is selected by selection 102, which is dumped into the third parallel queue 110, via switch 100. Again, the decoder 112 selects the vector 114 as the parallel queue 110 fills to decode only the selected audio coded bits from the terrestrial transmitter 18 which still has redundancy since the data from the terrestrial transmitter 18 is also encoded.

Figure 9:
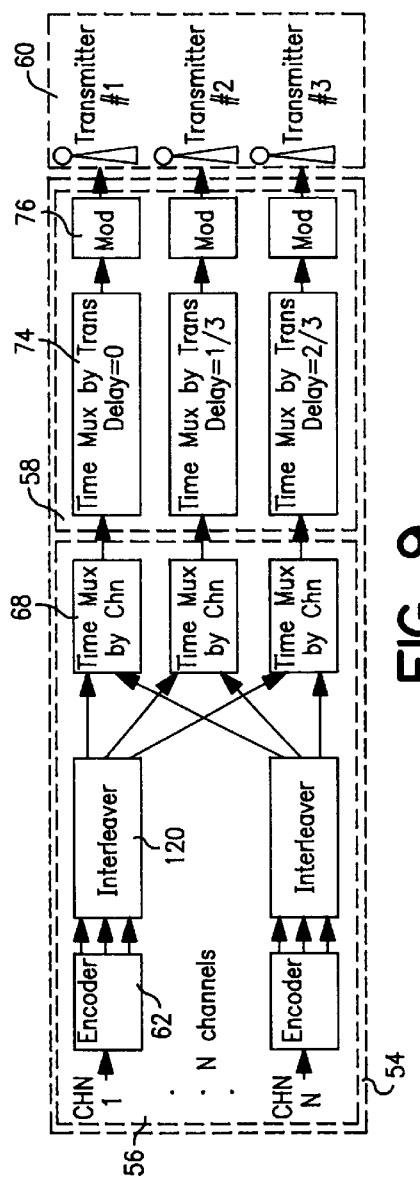
FIG. 9 is a detailed schematic block diagram of a channel coding/transmission system according to the teachings of a second preferred embodiment of the present invention.
Figure 10:
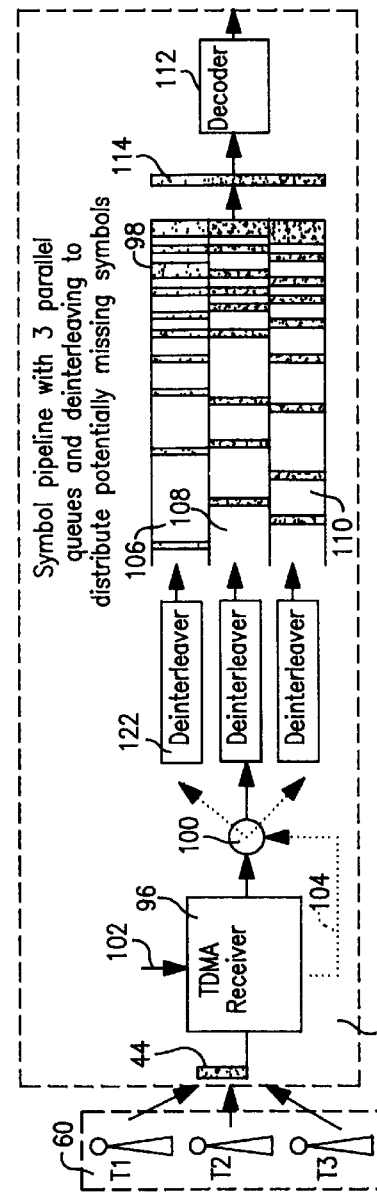
FIG. 10 is a detailed schematic block diagram of a receiver according to the teachings of the second preferred embodiment of the present invention.

Turning now to FIGS. 9 and 10, the channel coding/transmission system 54 and the receiver 40 according to the teachings of a second preferred embodiment in the present invention are shown. In this regard, like reference numerals will be used to identify similar structures with respect to first preferred embodiment in the present invention. The channel coding/transmission system 54 and the receiver 40 are substantially similar with respect to the first preferred embodiment of the present invention, except that the channel coding/transmission system 54 includes weighted interleavers 120 and the receiver 40 includes weighted deinterleavers 122. The weighted interleaver 120 randomly or non-uniformly distributes the expanded data bits in time between a minimum delay and a maximum delay to provide optimum decorrelation. In other words, the weighted interleavers 120 will route the expanded data bits pseudo randomly according to a non-uniform probability distribution from a minimum delay to a maximum delay.

The weighted interleavers 120 and the weighted deinterleavers 122 are discussed in detail in application Ser. No. 08/864,774, filed May 29, 1997, entitled "COMMUNICATION SYSTEM FOR BROADCASTING TO MOBILE USERS", naming as inventors Scott Adam Stephens, Terrence Raymond Smigla and Donald Ray Martin (TRW Docket No. 35-0005) and in U.S. Ser. No. 08/864,755, filed May 29, 1997, entitled "WEIGHTED INTERLEAVING FOR CORRELATED CHANNEL CODING", also naming as inventors Scott Adam Stephens, Terrence Raymond Smigla and Donald Ray Martin (TRW Docket No. 35-004), each of which are hereby incorporated by reference. Alternatively, the interleavers 120 and deinterleavers 122 may be conventional block or convolutional interleavers and deinterleavers.

The weighted deinterleavers 122 operates complimentary to the weighted interleavers 120 to unshuffle the coded data bits so that the coded data bits are aligned substantially similar to the coded data bits received by the weighted interleaver 120. This is shown graphically in the symbol pipeline 98 where each parallel queue 106, 108 and 110 are pseudo randomly filled, with the very right side of the symbol pipeline 98 or memory being filled prior to a vector 114 being decoded by the decoder 112.

The TDM communication system 10 thus allocates a TDM time block to each transmitter having a guard time around each time block for propagation time delay variations between the transmitters utilized. This allows the same or different information to arrive at a single receiver from multiple transmitters broadcasting in overlapping coverage areas substantially simultaneously. For satellite and terrestrial hybrid systems, a single time block may be allocated to all terrestrial transmitters which have spatially separated coverage areas from one another, thereby allowing spectrum reuse, while simultaneously reserving separate time blocks for the satellite transmitters having overlapping coverage areas which also overlap the terrestrial transmitter coverage areas. In this way, a receiver utilizing a single frequency band, can for example, receive two (2) satellite signals and a local terrestrial broadcast signal simultaneously, each with possibly different content. The system could also be dynamic in its allocation of time blocks to each transmitter.

For example, the terrestrial transmitter may operate dynamically to transmit both national broadcast channels, as well as local broadcast channels when either of the particular channels are available. Alternatively, the terrestrial transmitters may also be configured to transmit only local broadcast channels. Since the time synchronization and data stream information are contained in each TDM block header, the receiver is also able to operate even when all but one transmitter are not present.

This system provides the advantage that separate frequency bands are not required for multiple transmitters to reach a single receiver, with each transmitter sending different information. Any broadcast scenario where multiple transmitters of the same or different information are employed can use this communication system. This is especially true of any system which may deploy transmitters at different times where the allocation of bandwidth is dynamic and the receiver does not require the entire spectrum to be filled for operation.

For example, one such communication system may consist of two satellite transmitters and many terrestrial transmitters broadcasting digital audio programming. The broadcasting may initially start from only terrestrial transmitters in a few large cities having locally overlapping coverage areas. Each transmitter group may broadcast separate channels to local receivers, since these locally overlapping regions are spatially separate from other locally overlapping regions. When the satellites become operational, each satellite may then be allocated a large portion of the available bandwidth for national broadcasting while a single time block can be reserved for the local terrestrial broadcasts. The terrestrial transmitters can also serve another purpose. By dynamically allocating a portion of the national bandwidth for news or local programming or to retransmit part of the satellite information for information redundancy. This data is used by the receiver to form an audio stream with greater veracity, such as in urban environments where satellite signals may be degraded.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A time division multiplex (TDM) communication system for broadcasting to a plurality of receivers, said TDM communication system comprising:
   a first satellite transmitter operable to broadcast a first signal into a first coverage area, said first transmitter allocated a first TDM time block having a first guard time; and
   a second terrestrial transmitter operable to broadcast a second signal into a second coverage area which at least partially overlaps said first coverage area, said second transmitter allocated a second TDM time block having a second guard time, said first and second TDM time blocks forming at least a portion of a TDM repeat interval, said first and second guard times selected based upon signal time of arrival variations between said first and second transmitters, wherein said first transmitter broadcasts said first signal during said first TDM time block and said second transmitter broadcasts said second signal during said second TDM time block.

2. The TDM communication system defined in claim 1 further including a third transmitter which is a satellite transmitter operable to broadcast into a third coverage area.

3. The TDM communication system as defined in claim 2 wherein first coverage area is substantially the same as said third coverage area.

4. The TDM communication system as defined in claim 2 further comprising a system operation center operable to time multiplex a plurality of channel signals into said first signal and operable to time multiplex said plurality of channel signals into said second signal, said system operation center further operable to allocate said first TDM time block to said first satellite transmitter and said second TDM time block to said second satellite transmitter.

5. The TDM communication system as defined in claim 1 wherein said second TDM time block is shared by a plurality of terrestrial transmitters each broadcasting into a spatially separate coverage area from each of said terrestrial transmitters.

6. The TDM communication system as defined in claim 1 wherein said terrestrial transmitter dynamically allocates said second TDM time block between local and national channels.

7. The TDM communication system as defined in claim 1 wherein said first signal includes first time division multiplexed data and said second signal includes second time division multiplexed data.

8. The TDM communication system as defined in claim 7 wherein said first time division multiplexed data and said second time division multiplexed data are encoded.

9. The TDM communication system as defined in claim 8 wherein said encoded first time division multiplexed data and said encoded second time division multiplexed data are interleaved.

10. The TDM communication system as defined in claim 1 further comprising a receiver operable to receive said first signal during said first TDM time block and said second signal during said second TDM time block over said TDM repeat interval.

11. The TDM communication system as defined in claim 10 wherein said receiver includes a first parallel pipeline queue operable to store a portion of said first signal from said first transmitter and a second parallel pipeline queue operable to store a portion of said second signal from said second transmitter.

12. A time division multiplex (TDM) communication system for broadcasting to a plurality of receivers, said TDM communication system comprising:
- at least a first satellite transmitter allocated a first TDM time block and a plurality of second terrestrial transmitters allocated a second TDM time block shared by said second plurality of terrestrial transmitters, said TDM time blocks from said transmitters forming a TDM repeat interval, each of said TDM time blocks including a guard time determined by time of arrival variations between said transmitters; and
- a receiver within a coverage area operable to receive each of said signals from each of said transmitters during each of said TDM time blocks over said TDM repeat interval.

13. The TDM communication system as defined in claim 12 wherein each of said signals transmitted by said plurality of transmitters is a time division multiplexed signal.

14. The TDM communication system as defined in claim 13 wherein each of said time division multiplex signals from each of said transmitters is encoded.

15. The TDM communication system as defined in claim 14 wherein each of said encoded time division multiplexed signals from each of said transmitters is interleaved.

16. The TDM communication system as defined in claim 12 wherein said second TDM time block is dynamically allocated.

17. The TDM communication system as defined in claim 12 wherein said receiver includes a plurality of parallel pipeline queues corresponding to the number of allocated TDM time blocks in said TDM repeat interval.

18. The TDM communication system as defined in claim 12 wherein each of said transmitters broadcasts into at least a partially overlapping coverage area.

19. A time division multiplex (TDM) communication system for broadcasting to users, said TDM communication system comprising:
- a channel coding device having a plurality of first time multiplexers, each of said first time multiplexers operable to receive a plurality of channels and operable to time multiplex said plurality of channels into a TDM channel data stream;
- a waveform generation device having a plurality of second time multiplexers, said plurality of second time multiplexers operable to time multiplex each of said TDM channel data streams between a plurality of transmitters, each of said transmitters being allocated a separate TDM time block forming a portion of a TDM repeat interval; and
- a national system operation center and a local system operation center, said national system operation center housing a portion of said channel coding device and said waveform generation device and said local system operation center housing a portion of said channel coding device and said waveform generation device.

20. The TDM communication system as defined in claim 19 wherein said channel coding device further includes a plurality of encoders corresponding to the number of channels, each of said encoders operable to encode one of said channels.

21. The TDM communication system as defined in claim 20 wherein said channel coding device further includes a plurality of interleavers corresponding to the number of channels, each of said interleavers paired with an encoder.

22. The TDM communication system as defined in claim 19 wherein said waveform generation device further includes a plurality of modulators corresponding to the number of transmitters, each of said modulators operable to modulate a TDM channel data stream onto a RF carrier signal.

23. The TDM communication system as defined in claim 19 further comprising a receiver signal operable to receive each of said TDM channel data streams during each of said TDM time blocks over said TDM repeat interval.

24. The TDM communication system as defined in claim 19 wherein said plurality of channels are a plurality of digital audio channels.

25. A time division multiplex (TDM) communication system for broadcasting to users, said TDM communication system comprising:
- a channel coding device having a plurality of first time multiplexers, each of said first time multiplexers operable to receive a plurality of channels and operable to time multiplex said plurality of channels into a TDM channel data stream;
- a waveform generation device having a plurality of second time multiplexers, said plurality of second time multiplexers operable to time multiplex each of said TDM channel data streams between a plurality of transmitters, each of said transmitters being allocated a separate TDM time block forming a portion of a TDM repeat interval, wherein each of said transmitters broadcasts into at least a partially overlapping coverage area; and
- a national system operation center and a local system operation center, said national system operation center housing a portion of said channel coding device and said waveform generation device and said local system operation center housing a portion of said channel coding device and said waveform generation device.

* * * * *